United States Patent
Walsh et al.

(10) Patent No.: US 7,930,706 B1
(45) Date of Patent: Apr. 19, 2011

(54) MANAGING CACHE READER AND WRITER THREADS IN A PROXY SERVER

(75) Inventors: Richard J. Walsh, Raleigh, NC (US); Alfredo C. Issa, Apex, NC (US); James Evans, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1027 days.

(21) Appl. No.: 11/535,212

(22) Filed: Sep. 26, 2006

(51) Int. Cl.
*G06F 3/00* (2006.01)
*G06F 15/16* (2006.01)

(52) U.S. Cl. ............ 719/330; 709/203; 709/330; 710/7; 710/20; 710/52

(58) Field of Classification Search .................. None
See application file for complete search history.

(56) References Cited

U.S. PATENT DOCUMENTS

| | | | |
|---|---|---|---|
| 6,665,704 B1* | 12/2003 | Singh | 709/203 |
| 2004/0255048 A1* | 12/2004 | Lev Ran et al. | 709/249 |

OTHER PUBLICATIONS

Squid Web Proxy Cache, http://www.squid-cache.org/.
Architecture: An Architectural overview of Squid, http://wiki.cs.uiuc.edu/cs427/Architecture.

* cited by examiner

*Primary Examiner* — Andy Ho
*Assistant Examiner* — Tuan Dao
(74) *Attorney, Agent, or Firm* — Withrow & Terranova, PLLC

(57) ABSTRACT

A system and method are provided for managing reader and writer threads in a caching proxy server. In general, a caching proxy server operates as an intermediary between a web server and a number of client devices. The clients send requests for digital assets hosted by the web server to the caching proxy server. For each request, or more particularly for each group of concurrent requests, for a particular digital asset, the caching proxy server operates in either a decoupled writer mode of operation or a reader/writer mode operation. In addition, while serving the requests, the proxy server may switch between the decoupled writer and the reader/writer modes of operation depending on one or more criteria.

22 Claims, 9 Drawing Sheets

MANAGING CACHE READER AND WRITER THREADS IN A PROXY SERVER

FIELD OF THE INVENTION

The present invention relates to caching proxy servers and more particularly relates to managing reader and writer threads in a caching proxy server.

BACKGROUND OF THE INVENTION

A proxy server operates as an intermediary between a web server and clients requesting digital assets from the web server. Traditionally, proxy servers have used a thread, or process, per request approach because of its simplicity. In general, when the proxy server receives a request from a client, a thread is created or allocated to serve the request. The thread serves the request by sending a request for the requested digital asset to the web server, receiving the digital asset from the web server, and transferring the digital asset to the client. In order to provide improved performance, proxy servers may include a proxy cache used to store previously requested digital assets such that subsequent requests may be served directly from cache.

However, the traditional thread per request approach results in inefficiencies when serving concurrent requests for the same un-cached digital asset. For example, one approach to handling concurrent requests in a proxy server implementing the thread per request approach is to ignore inefficiencies and permit each thread to request the desired digital asset from the web server. This may be acceptable when requesting digital assets having a relatively small file size. However, when digital assets such as large images and videos are concurrently requested, the inefficiencies of the traditional thread per request approach are unacceptable.

Thus, there is a need for a proxy server and method of operation thereof for efficiently serving multiple concurrent requests for the same digital asset.

SUMMARY OF THE INVENTION

The present invention relates to a system and method for managing reader and writer threads in a caching proxy server. In general, a caching proxy server operates as an intermediary between a web server and a number of client devices. The clients send requests for digital assets hosted by the web server to the caching proxy server. For each request, or more particularly for each group of concurrent requests, for a particular digital asset, the caching proxy server operates in either a decoupled writer mode of operation or a reader/writer mode operation. In addition, while serving the requests, the proxy server may switch between the decoupled writer and the reader/writer modes of operation depending on one or more criteria.

In the decoupled writer mode, the proxy server provides a decoupled writer thread, or process, that obtains the requested digital asset from the web server and a separate dependent reader thread for each active request for the digital asset. The decoupled writer thread is not limited by the download speed of the client or clients requesting the digital asset. As the digital asset is received from the web server, the decoupled writer thread writes, or stores, the digital asset in the proxy cache. The dependent reader threads obtain, or read, the digital asset from the proxy cache and transfer the digital asset to the associated clients requesting the digital asset.

In the reader/writer mode of operation, the proxy server provides a separate reader/writer thread for each concurrent request for a particular digital asset. Preferably, one of the reader/writer threads is selected as a writer thread, while the reader/writer threads for the remaining requests are configured to be reader threads. The writer thread operates to obtain a segment of the requested digital asset from the web server and store the segment in the proxy cache. The writer thread then transfers the segment of the digital asset to the associated client. At the same time, the reader threads serve the digital asset to the associated clients from the proxy cache. Optionally, in order to optimize the transfer of the digital asset, the threads may be monitored to determine whether the role of the writer thread should be given to any one of the reader threads. If so, a role switch operation is performed wherein the writer thread is switched to a reader thread and a select one of the reader threads is switched to the role of writer thread. The writer thread then obtains the next segment of the digital asset from the web server, and the process continues until the digital asset has been served to each of the requesting clients.

In addition, the proxy server monitors the concurrent requests to determine whether to switch from the decoupled writer mode to the reader/writer mode or vice versa. More specifically, for each group of concurrent requests for a particular digital asset, the proxy server operates in either the decoupled writer mode or the reader/writer mode at any given time. However, in order to optimize the performance of the proxy server, the proxy server may monitor the requests for the digital asset, and, based on one or more criteria, determine whether to switch modes of operation while serving the requests.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
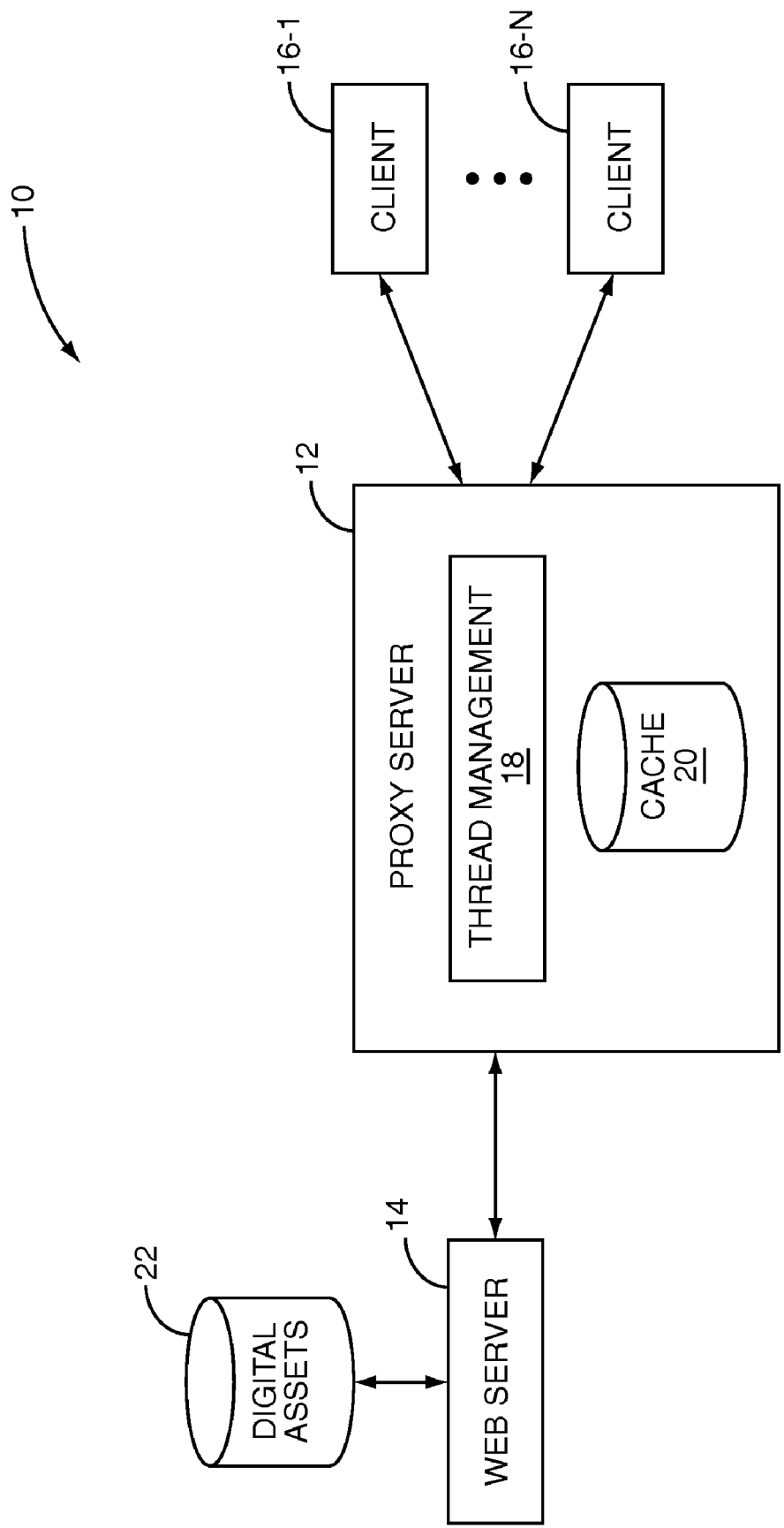
FIG. 1 illustrates a system including a proxy server having a decoupled writer mode of operation and a reader/writer mode of operation according to one embodiment of the present invention.

FIG. 1 illustrates a system 10 including a caching proxy server 12 operating to manage reader and writer threads according to the present invention. The caching proxy server 12 will hereafter be referred to as the proxy server 12. The proxy server 12 operates as an intermediary between a web server 14 and a number of clients 16-1 through 16-N. It should be noted that the web server 14 is exemplary. The proxy server 12 may operate as an intermediary between the clients 16-1 through 16-N and any type of server such as, for example, another proxy server, an audio or video distribution server, an Instant Messaging (IM) server, or the like.

In general, the proxy server 12 includes a thread management function 18 and a proxy cache 20. The thread management function 18 is preferably implemented in software residing on the proxy server 12. The operation of the thread management function 18 is the subject of the present invention and is discussed below in detail. However, in general, the thread management function 18 operates to generate or allocate threads and to manage the threads in order to serve requests from the clients 16-1 through 16-N for digital assets hosted by the web server 14. For each request or group of requests for a particular digital asset, the thread management function 18 operates in either a decoupled writer mode or a reader/writer mode of operation and may switch between the modes of operation depending on various criteria. The proxy cache 20 may be implemented as memory, such as Random Access Memory (RAM); one or more hard disk drives; one or more optical storage devices; or the like. Further, while the proxy cache 20 is illustrated as residing on the proxy server 12, the proxy cache 20 may alternatively be distributed among multiple devices such as multiple proxy servers. The proxy server 12 operates to cache digital assets requested from the web server 14 in the proxy cache 20 in order to serve requests from the clients 16-1 through 16-N, as discussed below.

The web server 14 may be any type of web server such as, for example, a central server in a centrally hosted digital asset sharing system or a peer node in a peer-to-peer (P2P) digital asset sharing system. The web server 14 operates to host a number of digital assets 22. The digital assets 22 may be stored in one or more digital storage units such as one or more hard disk drives, one or more optical storage devices, memory, or the like. The digital assets 22 may be digital images, digital videos, digital audio files, graphic files, documents, spreadsheets, presentations, slideshows, html code, text, or the like or any combination thereof.

The clients 16-1 through 16-N may each be a personal computer, mobile telephone, Personal Digital Assistant (PDA), portable media player, or the like having either wired or wireless access to the proxy server 12 via a network (not shown). The network may be a distributed public network such as the Internet, a Wide Area Network (WAN), a Local Area Network (LAN), a cellular network, or the like or any combination thereof. The network may include wired components, wireless components, or both. Like the web server 14, the clients 16-1 through 16-N may optionally be peer nodes in a P2P network.

Figure 2:
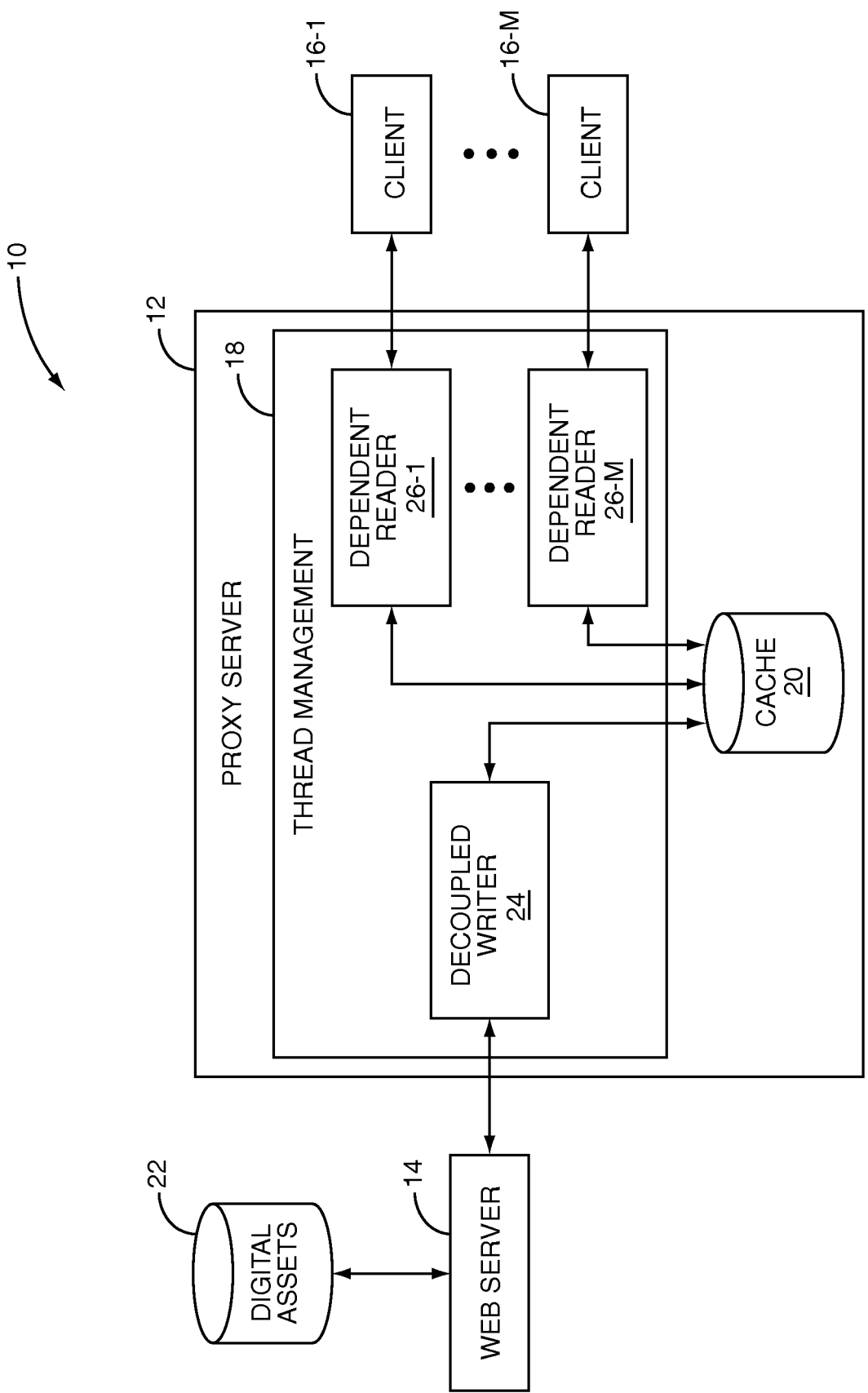
FIG. 2 illustrates the proxy server operating in a decoupled writer mode of operation according to one embodiment of the present invention.

FIG. 2 illustrates the system 10 when the proxy server 12 is operating according to the decoupled writer mode of operation. Before discussing the decoupled writer mode of operation, it may be beneficial to note that while the operation of the proxy server 12 discussed herein is applicable to a single request for a digital asset 22 hosted by the web server 14, the discussion herein is primarily focused on the situation where the proxy server 12 is serving multiple concurrent requests from a number of the clients 16-1 through 16-N for the same digital asset 22.

In this example, the proxy server 12 receives a number (M) of requests for a digital asset 22 hosted by the web server 14 from the clients 16-1 through 16-N. Note that the number (M) of requests is less than or equal to the total number (N) of clients 16-1 through 16-N. In this illustration, the proxy server 12 has selected the decoupled writer mode of operation to serve the requests. As such, the thread management function 18 provides a decoupled writer thread, or process, 24 for obtaining the requested digital asset 22 from the web server 14 and storing the digital asset 22 in the proxy cache 20. The thread management function 18 may provide the decoupled writer thread 24 by generating, or creating, a new decoupled writer thread or by assigning one of a number of existing threads to be the decoupled writer thread 24. While the decoupled writer mode requires an additional thread as compared to one-thread-per-request approaches, the benefit is that the decoupled writer thread 24 is not limited by the download speeds of the clients 16-1 through 16-M.

The thread management function 18 also provides dependent reader threads 26-1 through 26-M for serving the requests. The thread management function 18 may provide the dependent reader threads 26-1 through 26-M by creating new dependent reader threads. Alternatively, the thread management function 18 may provide the dependent reader threads 26-1 through 26-M by allocating ones of a number of existing dependent reader threads. Each of the dependent reader threads 26-1 through 26-M serves a corresponding request from one of the clients 16-1 through 16-M. In operation, the decoupled writer thread 24 obtains the requested digital asset 22 from the web server 14 and stores the requested digital asset 22 in the proxy cache 20. As the decoupled writer thread 24 obtains the requested digital asset 22 and writes the requested digital asset 22 to the proxy cache 20, the dependent reader threads 26-1 through 26-M operate to obtain the requested digital asset 22 from the proxy cache 20 and provide the digital asset 22 to the corresponding clients 16-1 through 16-M.

Figure 3:
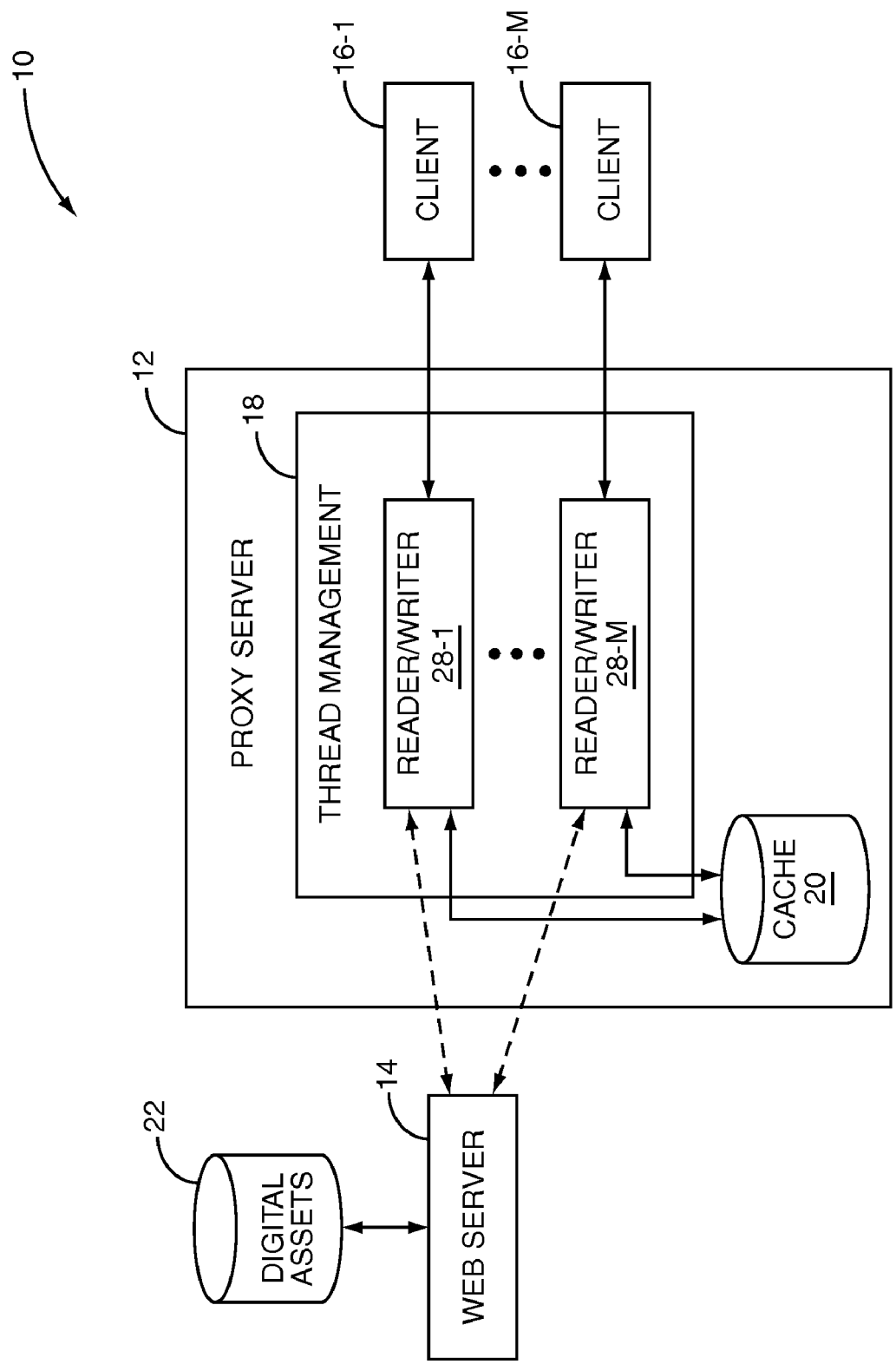
FIG. 3 illustrates the proxy server of FIG. 1 operating in the reader/writer mode of operation according to one embodiment of the present invention.

FIG. 3 illustrates the system 10 when the proxy server 12 is operating according to the reader/writer mode of operation. In this example, the proxy server 12 receives a number (M) of requests for a digital asset 22 hosted by the web server 14 from the clients 16-1 through 16-N. Note that the number (M) of requests is less than or equal to the total number (N) of clients 16-1 through 16-N. In this illustration, the proxy server 12 has selected the reader/writer mode of operation to serve the requests. As such, the thread management function 18 provides a separate reader/writer thread 28-1, 28-M for each of the requests. The thread management function 18 may provide the reader/writer threads 28-1 through 28-M by generating, or creating, a new reader/writer thread for each request or by assigning ones of a number of existing threads to be the reader/writer threads 28-1 through 28-M.

Each of the reader/writer threads 28-1 through 28-M is capable of obtaining the requested digital asset 22 from the web server 14 and storing the digital asset 22 in the proxy cache 20 as well as obtaining the digital asset 22 from the proxy cache 20 and transferring the digital asset 22 to the associated client 16-1, 16-M requesting the digital asset 22. However, when the proxy server 12 is serving multiple requests for the same digital asset 22 in the reader/writer mode, one of the reader/writer threads 28-1 through 28-M is selected as a writer while the rest of the reader/writer threads 28-1 through 28-M for the remaining requests are readers. Preferably, only one of the reader/writer threads 28-1 through 28-M is selected as the writer at any given time. The reader/writer thread 28-1, 28-M selected as the writer operates to obtain a segment of the requested digital asset 22 from the web server 14, write the segment to the proxy cache 20, and then transfer the segment to the corresponding client 16-1, 16-M. Note that the segment size may or may not vary throughout the transfer process. The readers operate to serve the requested digital asset 22 to the corresponding ones of the clients 16-1 through 16-M from the proxy cache 20. The roles of writer and readers may be switched while serving the request in order to optimize the transfer of the requested digital asset 22 from the web server 14 to the ones of the clients 16-1 through 16-M.

In operation, when the proxy server 12 receives a first request for a digital asset 22 hosted by the web server 14 and is to operate in the reader/writer mode of operation, the thread management function 18 provides a reader/writer thread 28-1 for the request. Since the request is the only active request at this time, the reader/writer thread 28-1 is selected as the writer and begins to obtain a first segment of the requested digital asset 22 from the web server 14. Note that by obtaining the digital asset 22 in segments, the thread management function 18 is enabled to perform role switching, as discussed below. Once the first segment of the requested digital asset 22 is obtained, the reader/writer thread 28-1 writes the segment to the proxy cache 20. The reader/writer thread 28-1 then switches to a read mode and transfers the segment of the digital asset 22 to the corresponding client 16-1. The process continues until the digital asset 22 is transferred to the corresponding client 16-1.

However, if the proxy server 12 receives a second request for the same digital asset 22 from, for example, the client 16-M before the reader/writer thread 28-1 has completely transferred the digital asset 22 to the client 16-1, the thread management function 18 creates or allocates the reader/writer thread 28-M for serving the second request and configures the reader/writer thread 28-M as a reader. As a reader, the reader/writer thread 28-M serves the digital asset 22 to the client 16-M from the proxy cache 20 and does not communicate with the web server 14 for obtaining the digital asset 22 unless the reader/writer thread 28-M is subsequently switched to the role of writer thread.

The reader/writer thread 28-M then begins to serve the digital asset 22 from the proxy cache 20. The thread management function 18 monitors the reader/writer threads 28-1 and 28-M and, depending on the connection speeds to the associated clients 16-1 and 16-M, may switch the roles of the reader/writer threads 28-1 and 28-M such that the thread 28-M is configured as the writer and the thread 28-1 is configured as a reader. The role switch may be desirable when, for example, the connection speed to the client 16-M associated with the reader/writer thread 28-M is faster than the connection speed to the client 16-1 associated with the reader/writer thread 28-1 and the reader/writer thread 28-M has reached the end of the cached portion of the digital asset 22. The process continues until the transfer of the requested digital asset 22 from the web server 14 to the clients 16-1 and 16-M is complete.

Figure 4:
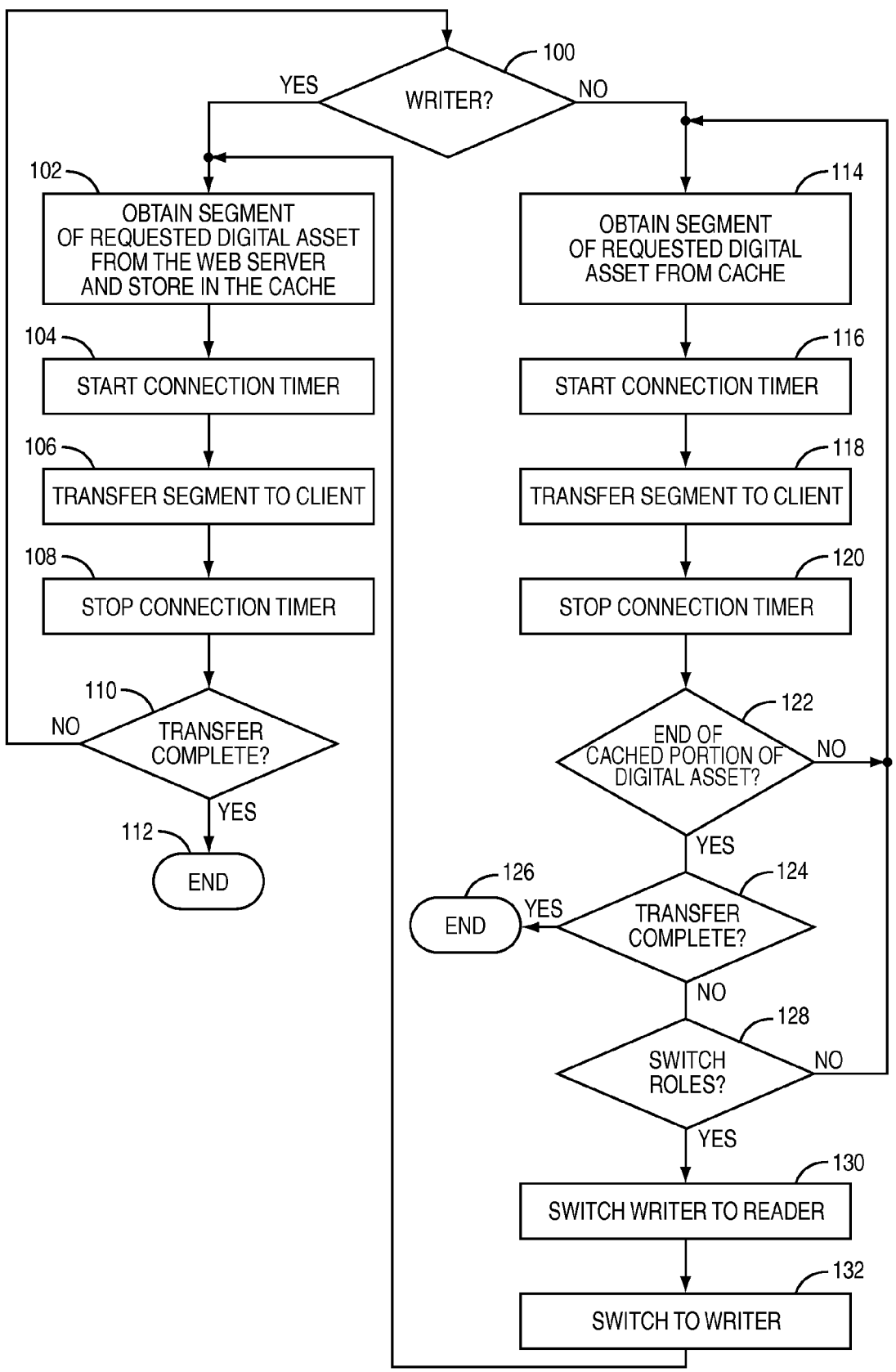
FIG. 4 is a flow chart illustrating the operation of a reader/writer thread according to one embodiment of the present invention.

FIG. 4 is a flow chart illustrating the operation of the reader/writer thread 28-1 of FIG. 3 according to one embodiment of the present invention. However, this discussion is equally applicable to all of the reader/writer threads 28-1 through 28-M. Note that this flow chart is exemplary and not intended to limit the scope of the present invention. Numerous variations will be apparent to one of ordinary skill in the art upon reading this disclosure.

In this example, the reader/writer thread 28-1 first determines whether it has been selected as the writer (step 100). If so, the reader/writer thread 28-1 obtains the first segment, or next segment, of the requested digital asset 22 from the web server 14 and stores the segment in the proxy cache 20 (step 102). Optionally, in order to measure the connection speed between the proxy server 12 and the client 16-1 making the request, a connection timer may be started (step 104). The reader/writer thread 28-1 then switches to a reader mode and transfers the segment of the digital asset 22 to the client 16-1 (step 106). The reader/writer thread 28-1 may then stop the connection timer (step 108). The connection timer may thereafter be used to determine the connection speed for the client 16-1, where the connection speed may be used to determine whether a role switching operation should be performed. At this point, if the transfer of the entire digital asset 22 is complete (step 110), the process ends (step 112). Otherwise, the process returns to step 100 and repeats until the transfer is complete. As discussed below, the role of the reader/writer thread 28-1 may be switched from writer to reader while serving the request. If so, the outcome of step 100 will change and the reader/writer thread 28-1 will then proceed to serve the request as a reader.

It should be noted that in an alternative embodiment, steps 104-108 may be performed concurrently with step 102. Thus, while the segment is obtained, the segment may be stored in cache and transferred to the client concurrently or at substantially the same time.

Returning to step 100, if the reader/writer thread 28-1 is not selected as the writer, the reader/writer thread 28-1 is a reader. As a reader, the reader/writer thread 28-1 obtains the first or next segment of the requested digital asset 22 to be transferred to the client 16-1 from the proxy cache 20 (step 114). The reader/writer thread 28-1 then starts the connection timer (step 116), transfers the segment of the requested digital asset 22 to the client 16-1 (step 118), and then stops the connection timer (step 120). Again, note that steps 116 and 120 are optional. In one embodiment, the segment obtained from the proxy cache 20 and transferred to the client 16-1 may be all bytes of the digital asset 22 that have been obtained by the writer and stored in the proxy cache 20 up until that point in time or any portion thereof. In another embodiment, the segment may correspond to one of the segments previously obtained from the web server 14 by the writer and stored in the proxy cache 20.

It should be noted that in an alternative embodiment, steps 116-120 may be performed concurrently with step 114. Thus, while the segment is obtained from cache, the segment may be transferred to the client concurrently or at substantially the same time. As another alternative, steps 114 and 118 may be compressed into a single step where the segment is transferred directly from cache to the client.

At this point, if the reader/writer thread 28-1 has not reached the end of the cached portion of the digital asset 22

(step 122), the process returns to step 114 and steps 114-120 are repeated until the reader/writer thread 28-1 reaches the end of the cached portion of the digital asset 22. If the reader/writer thread 28-1 has reached the end of the cached portion of the digital asset 22, the reader/writer thread 28-1 determines whether the transfer of the digital asset 22 is complete (step 124). If so, the process ends (step 126). If not, in this example, the reader/writer thread 28-1 determines whether it should switch roles with the writer thread (step 128). In this example, the reader/writer thread 28-1 determines whether to switch roles with the writer thread based on a comparison of the connection speed of the writer and the connection speed of the reader/writer thread 28-1 and optionally a comparison of the connection speed of the reader/writer thread 28-1 and the connection speeds of other ones of the reader/writer threads at substantially the same point in the transfer process. More specifically, the reader/writer thread 28-1 has, at this point, reached the end of the cached portion of the digital asset 22. As such, if the connection speed for the reader/writer thread 28-1 is faster than the connection speed for the current writer thread, the reader/writer thread 28-1 and the current writer thread switch roles.

The determination as to whether a role switch should be performed may be made by the reader/writer thread 28-1 or the thread management function 18. Thus, in one embodiment, the reader/writer thread 28-1 may obtain the connection speed of the current writer thread. Then, the reader/writer thread 28-1 may make the determination as to whether a role switch should be performed based on the connection speed obtained from the writer thread and the connection speed of the reader/writer thread 28-1. Alternatively, the thread management function 18 may make the decision as to whether to perform the role switch based on a comparison of the connection speeds of the two threads and optionally the connection speeds of other reader/writers threads.

If the reader/writer thread 28-1 is to switch roles with the current writer thread, the current writer thread is switched to a reader (step 130), and the reader/writer thread 28-1 is selected as the writer (step 132). The reader/writer thread 28-1 may switch the current writer thread to the role of a reader. Alternatively, the thread management function 18 may perform the switch. Once the role switch is complete, the process proceeds to step 102 and continues until the transfer of the digital asset 22 is complete.

Returning to step 128, if a role switch is not to be performed, the process returns to step 114 and is repeated until the transfer of the digital asset 22 is complete.

In the above example, the reader/writer thread 28-1 determines whether to perform a role switch after reaching the end of the cached portion of the digital asset 22. However, the present invention is not limited thereto. For example, the thread management function 18 may monitor the connection speeds of all of the reader/writer threads 28-1 through 28-M that are processing requests for the digital asset 22 and determine whether a role switch should be performed at any time. Further, it is not necessary that the thread management function 18 wait until the reader/writer thread 28-1, 28-M that is to be switched from the reader role to the writer role reaches the end of the cached portion of the digital asset 22 before performing the role switch.

Figure 5A:
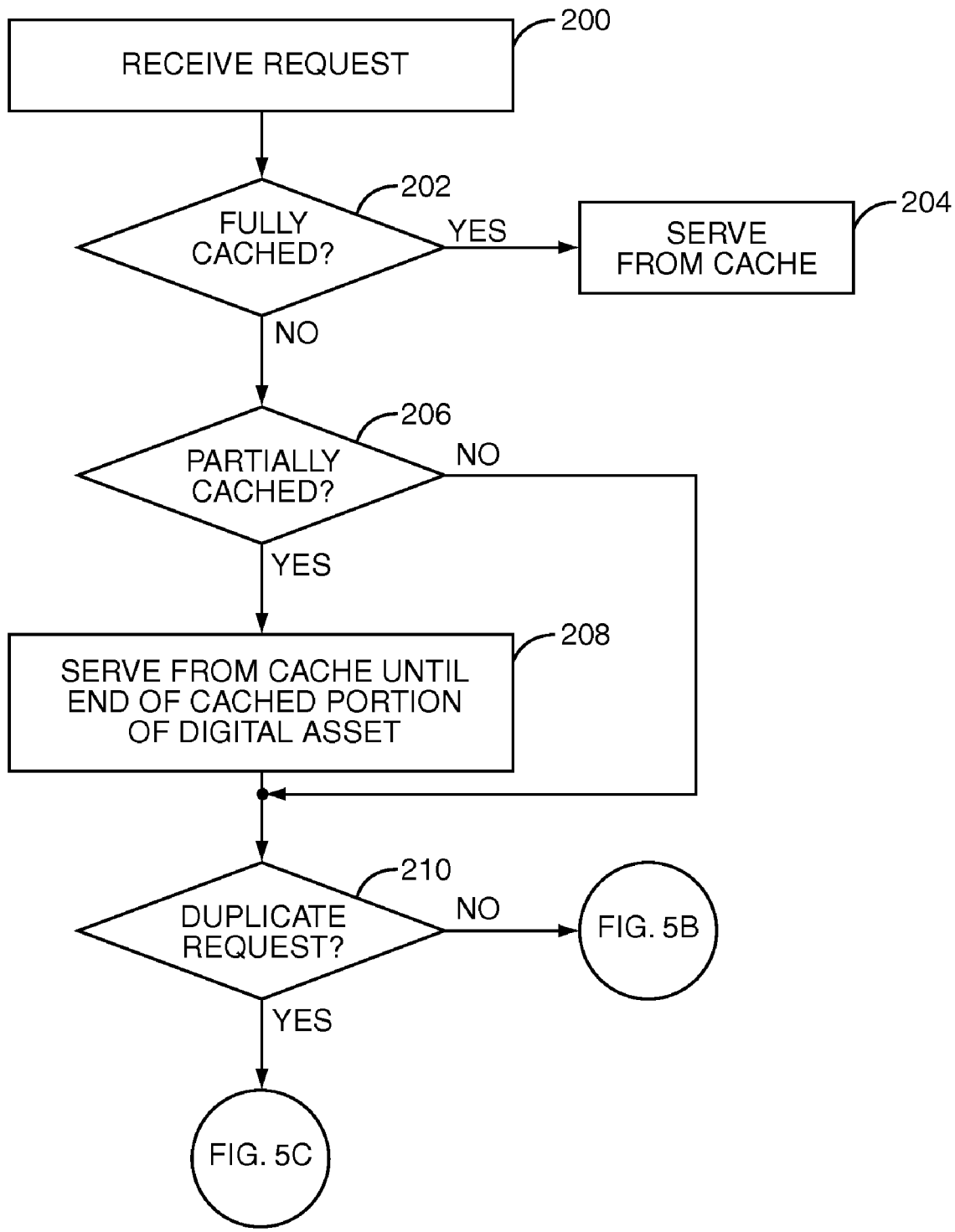
FIGS. 5A-5C illustrate the operation of the thread management function to process requests and select a desired mode of operation to serve each group of requests for a particular digital asset according to one embodiment of the present invention.
Figure 5B:
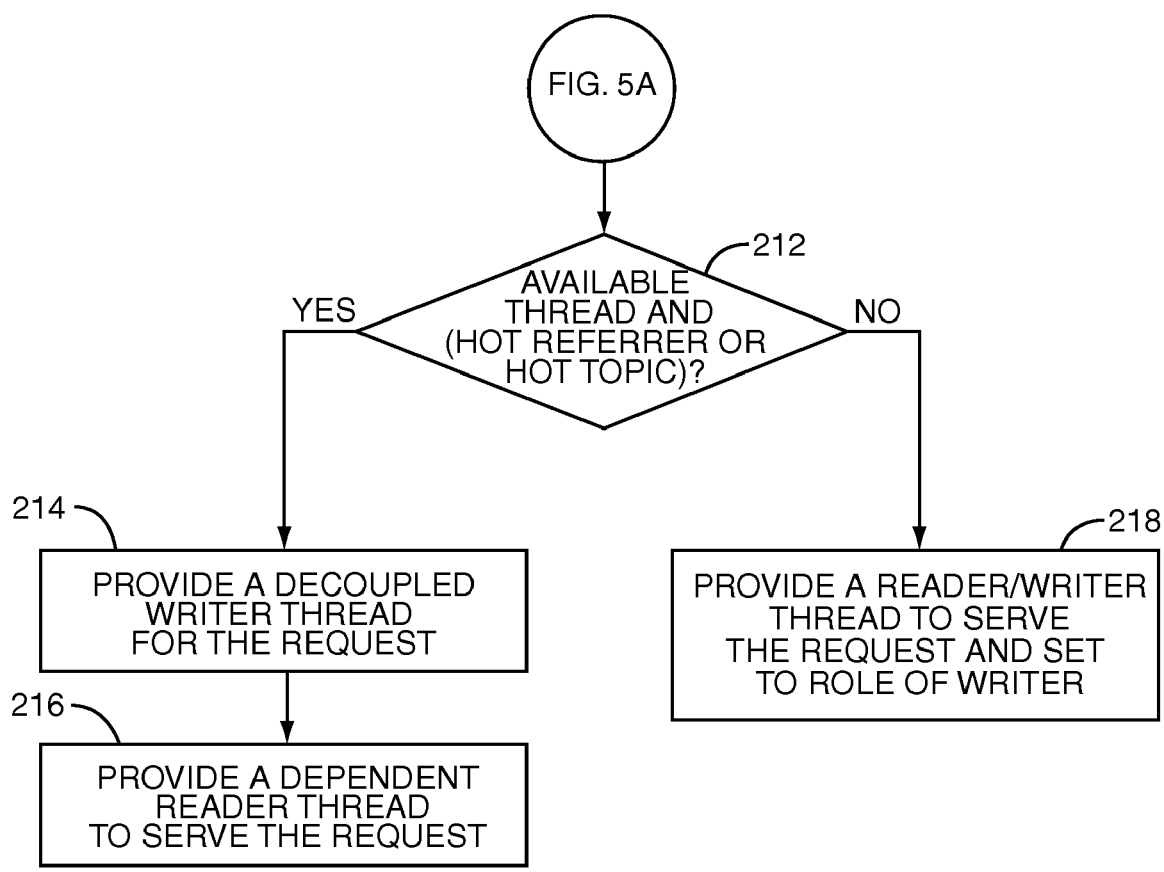
Figure 5C:
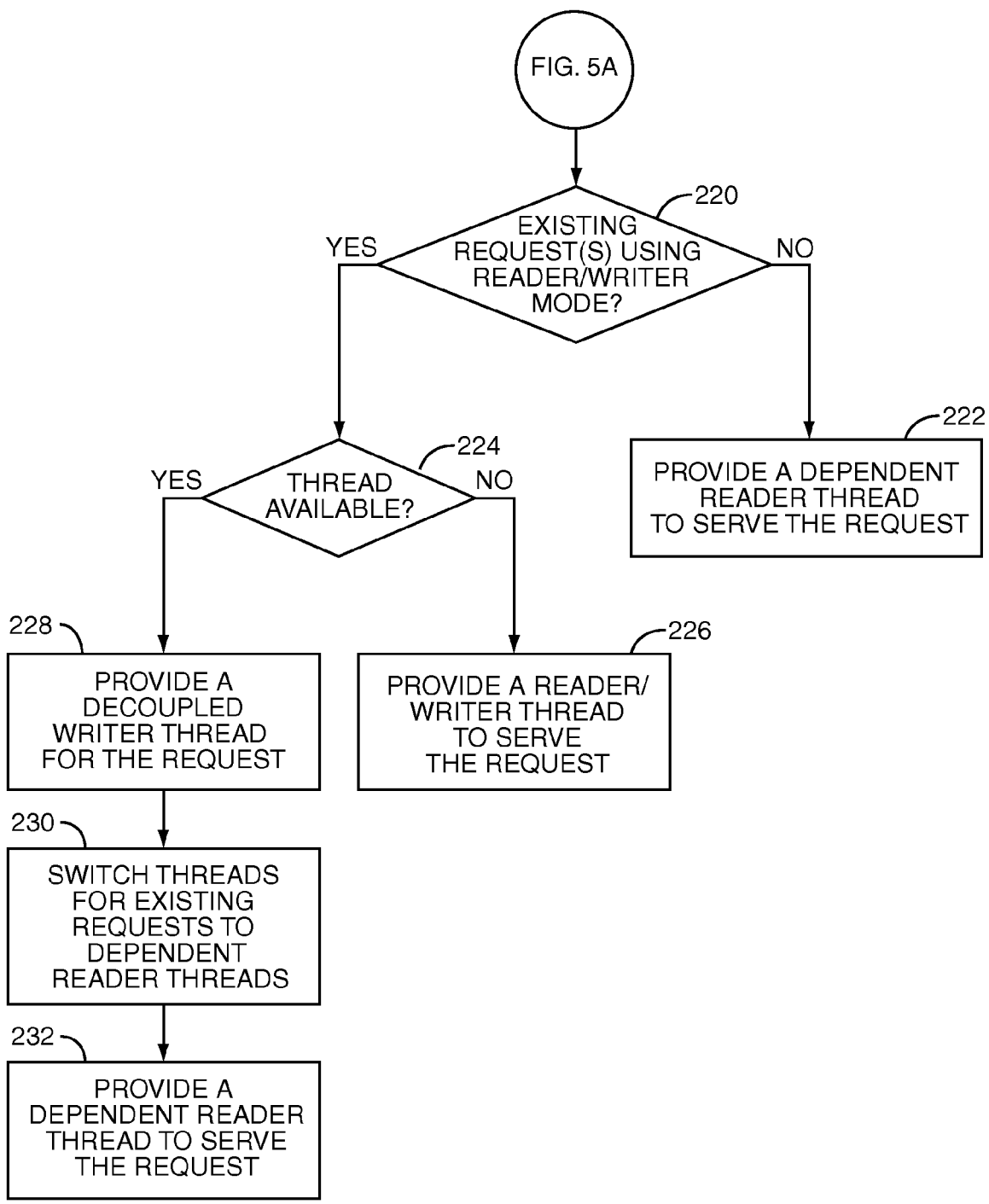

FIGS. 5A-5C illustrates the operation of the proxy server 12, and more specifically the operation of the thread management function 18, to process a request and determine whether to switch modes of operation. It should be noted that the process of FIGS. 5A-5C is exemplary and is not intended to limit the scope of the present invention. Numerous variations will be apparent to one of ordinary skill in the art upon reading this disclosure.

First, the proxy server 12 receives a request from one of the clients, which for this example is the client 16-1 (step 200). The thread management function 18 then determines whether the requested digital asset 22 is fully cached and the process ends (step 202). If so, thread management function 18 creates or allocates a thread, or process, that serves the requested digital asset 22 to the client 16-1 from the proxy cache 20 (step 204). If not, the thread management function 18 then determines whether the requested digital asset 22 is partially cached (step 206). If so, the thread management function 18 creates or allocates a thread that serves the digital asset 22 to the client 16-1 from the proxy cache 20 until the thread reaches the end of the cached portion of the digital asset 22 (step 208).

Next, whether or not the digital asset 22 was partially cached, the thread management function 18 determines whether the request is a duplicate request (step 210). The request is a duplicate request if there are other active requests being processed by the proxy server 12 for the same digital asset 22. If the request is not a duplicate request, the process continues to FIG. 5B. If the request is a duplicate request, the process continues to FIG. 5C.

Turning to FIG. 5B, if the request is a duplicate request, the thread management function 18 determines whether there is an available thread for a decoupled writer and, optionally, whether the request is from a "hot" referrer or for a "hot" topic (step 212). Note that the criteria of step 212 are exemplary and are not intended to limit the scope of the present invention. Additional or alternative criteria may be used as will be apparent to one of ordinary skill in the art upon reading this disclosure. In one embodiment, the proxy server 12 has a system-defined or administrator-defined limit to the number of threads that may be running simultaneously on the proxy server 12 for serving requests. The limit may be imposed by allowing the thread management function 18 to create new threads if the number of threads currently running on the proxy server 12 is less than the limit. Alternatively, the thread management function 18 may automatically create the maximum number of threads and operate to allocate those threads to requests as the requests are received. Thus, a thread for a decoupled writer is available if the number of threads currently being used to process requests is less than the limit taking into consideration the thread needed to serve the current request.

Before discussing "hot" referrers, it may be beneficial to discuss referrers in general. As an example, a Hypertext Transfer Protocol (HTTP) request may contain referrer information identifying a webpage or website linking to a requested digital asset 22. Thus, if the user of the client 16-1 is browsing a website including a link to a digital asset 22 hosted by the web server 14 and the user activates the link, the client 16-1 generates a request for the digital asset 22 including referrer information identifying the webpage or website including the link and provides the request to the proxy server 12. Accordingly, by examining the request, the proxy server 12 can identify the referrer, if any, for the request.

The proxy server 12 has access to or maintains a list of "hot" referrers. Thus, in one embodiment, a remote server maintains a list of "hot" referrers, where the list of "hot" referrers is accessible by the proxy server 12. The remote server generally maintains a list of "hot" referrers and optionally a priority associated with each. As an example, the owners or operators of webpages or websites may pay a fee to have their webpages or websites included on the "hot" referrer list, where the amount of the fee may correspond to priority. As another example, the remote server may aggregate the information from a number of proxy servers such as the proxy server 12 and/or web servers such as the web server 14 regarding the referrers of received requests. Based on this information, the remote server may identify "hot" referrers.

In another embodiment, the proxy server 12 may maintain the list of "hot" referrers. For example, the proxy server 12 may examine the referrer information, if any, for each request received by the proxy server 12. The proxy server 12 may process the referrer information to create the list of "hot" referrers. For example, the most popular referrers may be identified as the list of "hot" referrers and assigned priorities based on relative popularity.

In a similar fashion, a list of "hot" topics may be maintained. The proxy server 12 or some remote server may identify "hot" topics based on metadata semantically describing digital assets 22 requested from the web server 14 and/or a number of other web servers. For example, a search engine website such as http://www.yahoo.com or http://www.google.com may be used to identify "hot" topics or popular topics based on search requests from their users. These websites may then generate and provide access to the "hot" topic list. The "hot" topics may be a list of the most popular topics, where the topics may be prioritized based on relative popularity. In a similar fashion, the proxy server 12 may generate and maintain the "hot" topic list based on a semantic understanding of the digital assets 22 requested by the clients 16-1 through 16-N, where, for example, the semantic understanding may be obtained from metadata such as keywords associated with the requested digital assets 22.

If a thread is available and the request is either from a "hot" referrer or for a digital asset 22 related to a "hot" topic, the thread management function 18 determines that the request is to be processed according to the decoupled writer mode of operation. As such, the thread management function 18 provides a decoupled writer thread (step 214) for obtaining the requested digital asset 22 from the web server 14. In addition, the thread management function 18 provides a dependent reader thread to serve the request (step 216). The thread management function 18 provides the dependent reader thread by, for example, creating a new dependent reader thread or allocating one of a number of existing threads as the dependent reader thread. As discussed above, as the decoupled writer thread writes the requested digital asset 22 to the proxy cache 20, the dependent reader thread operates to obtain the requested digital asset 22 from the proxy cache 20 and transfer the requested digital asset 22 to the corresponding client 16-1.

Returning to step 212, if there is not an available thread or if the request is not from a "hot" referrer or for a digital asset 22 related to a "hot" topic, then the thread management function 18 provides a reader/writer thread to serve the request and, since the request is not a duplicate request for the digital asset 22, sets the reader/writer thread to the writer role (step 218). The thread management function 18 provides the reader/writer thread by, for example, creating a new reader/writer thread or allocating one of a number of existing threads as the reader/writer thread for the request. Once provided, the reader/writer thread serves the request, as described above.

Now turning to FIG. 5C, if the request is a duplicate request, the thread management function 18 determines whether the threads serving the existing requests are using the reader/writer mode of operation (step 220). If not, then the existing requests are using the decoupled writer mode. As such, the thread management function 18 provides a dependent reader thread to serve the request (step 222). As discussed above, the operation of the dependent reader thread is dependent upon the decoupled writer. More specifically, as the decoupled writer thread writes the requested digital asset 22 to the proxy cache 20, the dependent reader obtains the requested digital asset 22 from the proxy cache 20 and transfers the requested digital asset 22 to the corresponding client 16-1.

Returning to step 220, if the threads serving the existing requests are using the reader/writer mode of operation, then the thread management function 18 determines whether a thread is available for a decoupled writer (step 224). If a thread is not available for a decoupled writer, then the thread management function 18 provides a reader/writer thread to serve the request in the manner described above and sets this thread as reader of the existing writer thread (step 226). If a thread is available for a decoupled writer, the thread management function 18 provides a decoupled writer thread for the request (step 228), switches the reader/writer threads for the existing requests for the digital asset 22 to dependent reader threads of the decoupled writer thread (step 230), and provides a dependent reader thread to serve the request (step 232). The decoupled writer thread and the dependent reader threads then operate to serve the existing requests and the current request in the manner described above.

Figure 6:
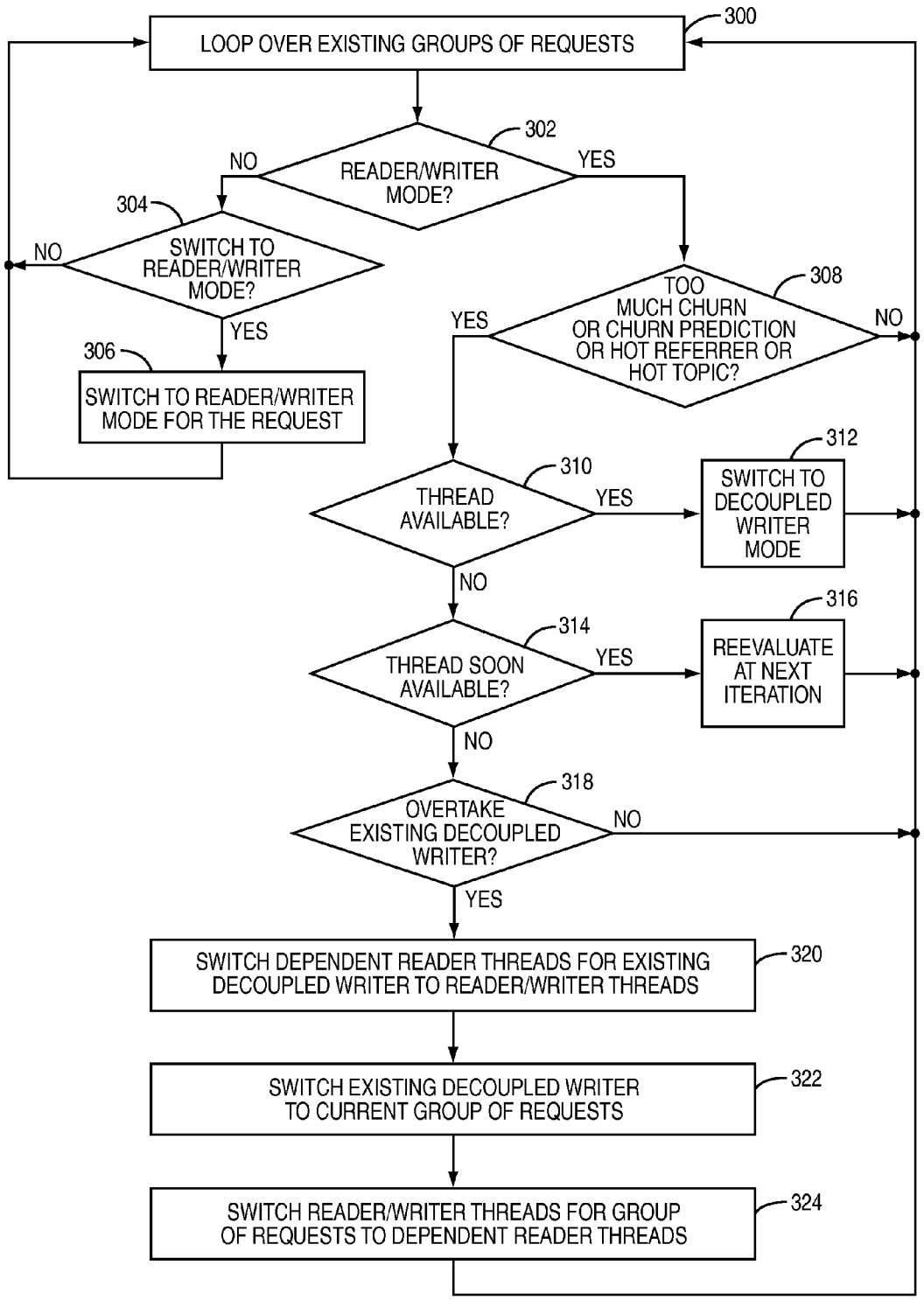
FIG. 6 illustrates the operation of the thread management function to monitor groups of active requests and switching modes of operation for the groups of active requests according to one embodiment of the present invention.

After initially selecting the mode of operation upon receiving a request as described above with respect to FIGS. 5A-5C, the thread management function 18 monitors the requests, or more specifically the threads serving the requests, and determines whether to switch modes of operation. More specifically, FIG. 6 illustrates an exemplary mode switching process performed by the thread management function 18 to determine whether to switch modes of operation for each group of requests. It should be noted that the process of FIG. 6 is exemplary and is not intended to limit the scope of the present invention. Numerous variations will be apparent to one of ordinary skill in the art upon reading this disclosure.

First, the thread management function 18 begins to loop over existing groups of requests (step 300). For each loop of the illustrated process, the thread management function 18 is monitoring a group of requests for a particular digital asset 22. The group may include one or more requests. The thread management function 18 first determines whether the group of requests is being served according to the reader/writer mode of operation or the decoupled writer mode of operation (step 302). If the group of requests is being served according to the decoupled writer mode of operation, the thread management function 18 determines whether to switch to the reader/writer mode of operation (step 304). The determination may consider factors such as whether the request is for a "hot" topic, whether the request is from a "hot" referrer, the number of requests, and the like. For example, if the number of active requests falls to one and the request is neither from a "hot" referrer or for a digital asset 22 related to a "hot" topic, then the thread management function 18 may decide to switch to the reader/writer mode of operation.

If the thread management function 18 decides not to switch to the reader/writer mode of operation, the process returns to step 300 and the loop is repeated for the next group of requests. However, if the thread management function 18 decides to switch to the reader/writer mode of operation, then the thread management function 18 switches to the reader/writer mode of operation for the group of requests (step 306). More specifically, the thread management function 18 terminates the decoupled writer thread, switches the associated dependent reader threads to reader/writer threads, and selects one of the reader/writer threads to operate in the role of writer while the rest of the reader/writer threads are configured to operate in the role of readers. The dependent reader threads may be switched to reader/writer threads by, for example, reconfiguring the dependent reader threads as reader/writer threads or by creating or allocating reader/writer threads and switching responsibility for serving the requests from the dependent reader threads to the created or allocated reader/writer threads. The thread management function 18 may consider factors such as the connection speeds to the clients associated with each of the reader/writer threads, the portion of the cached digital asset 22 still to be transferred by each of the reader/writer threads, and the like when selecting the reader/writer thread for the writer role. The process then returns to step 300 and the loop is repeated for the next group of requests.

Returning to step 302, if the group of requests is being served according to the reader/writer mode of operation, the thread management function 18 determines whether to switch to the decoupled writer mode of operation. More specifically, in this example, the thread management function 18 first determines whether there is too much churn, whether too much churn is predicted, whether the referrer is a "hot" referrer, or whether the requested digital asset 22 is related to a "hot" topic (step 308). Note that these criteria are exemplary and are not intended to limit the scope of the present invention. Other criteria may additionally or alternatively be used as will be apparent to one of ordinary skill in the art upon reading this disclosure.

Regarding whether there is too much churn, the thread management function 18 compares a churn value to a predetermined threshold defining the allowable maximum churn. If the churn value exceeds the threshold, then there is too much churn. The churn value may be, for example, the number of role switches having occurred while serving the group of requests, the number of role switches over a predefined time window while serving the group of requests, the frequency of role switches by time (ex. X roles switches per second), the frequency of role switches by number of bytes (ex. X roles switches per Megabyte), or the like.

Note that when determining whether there is too much churn, the thread management function 18 may account for operating system specific and implementation specific costs associated with role switching. For example, thread management function 18 may consider whether the reader/writer threads are implemented as user level threads or kernel threads. User level threads may have less cost associated with role switching. As another example, if the proxy server 12 is implemented based on Linux Kernel Version 2.6, role switching may have a lesser cost than if the proxy server 12 is implemented based on Windows XP.

Churn prediction is similar to determining whether there is too much churn. However, for churn prediction, the thread management function 18 may determine whether too much churn is likely to be experienced in the near future. For example, the thread management function 18 may determine the number of readers having connection speeds that are faster than or equal to the connection speed of the writer that will soon be competing for the role of writer. If the number of reader/writer threads that will be competing for the role of writer is greater than a predetermined threshold, the thread management function may predict too much churn.

If none of the criteria in step 308 are satisfied, then the thread management function 18 decides to remain in reader/writer mode for the group of requests. The process then returns to step 300, and the loop is repeated for the next group of requests.

However, if any of the criteria in step 308 are satisfied, the thread management function 18 then determines whether there is a thread available for a decoupled writer (step 310). If so, the thread management function 18 switches the decoupled writer mode of operation for the group of requests (step 312). More specifically, the thread management function 18 provides a decoupled writer thread for the request and switches the reader/writer threads serving the group of requests to dependent reader threads. The reader/writer threads may be switched to dependent reader threads by, for example, reconfiguring the reader/writer threads as dependent reader threads or by creating or allocating dependent reader threads and switching responsibility for serving the requests from the reader/writer threads to the created or allocated dependent reader threads. Thereafter, the process returns to step 300, and the loop is repeated for the next group of requests.

If a thread for a decoupled writer is not available, then the thread management function 18 determines whether a thread for a decoupled writer will soon be available (step 314). In order to determine whether a thread for a decoupled writer will soon be available, the thread management function 18 may consider the number of short lived requests in process. For example, if there are 10 short lived requests currently being processed, the thread management function 18 determines that it is very likely that a thread for a decoupled writer will soon be available. As another example, the thread management function 18 may compare the estimated completion time for other requests to a predetermined threshold. More specifically, the thread management function 18 may determine an estimated completion time for one or more active decoupled writer threads. Alternatively, the thread management function 18 may consider both decoupled writer threads and reader/writer threads. If one of the active threads has an estimated completion time less than the predetermined threshold, then the thread management function 18 determines that a thread for a decoupled writer will soon be available. Optionally, once an active request with an estimated completion time less than the predetermined threshold is identified, the thread management function 18 may pre-allocate the thread to serve as the decoupled writer thread for the group of requests.

If a thread will soon be available for a decoupled writer, the thread management function 18 determines that the group of requests is to be reevaluated during the next iteration of the loop for the group of requests (step 316). The group of requests may be reevaluated in the immediately following iteration or according to the normal progression through the groups of requests. At this point, the process returns to step 300.

If a thread will not soon be available for a decoupled writer, the thread management function 18 determines whether an existing decoupled writer for another group of requests should be overtaken and used as a decoupled writer for the current group of requests (step 318). More specifically, in an exemplary embodiment, the thread management function 18 assigns a relative priority to the groups of requests associated with the existing decoupled writer threads and the current group of requests. In order to determine the relative priorities of the groups of requests, the thread management function 18 may consider, for example, a number of readers that would compete for the role of writer if the group of requests was processed according to the reader/writer mode of operation, the number of dependent readers at or near the end of the requested digital asset 22, a number of premium level users associated with the requests in the group of requests, referrer priority, churn prediction, and topic priority. Note that users of the clients 16-1 through 16-N may become premium users by, for example, paying a fee.

If the current group of requests has the lowest relative priority, an existing decoupled writer thread is not to be overtaken. As such, the process returns to step 300, and the loop is repeated for the next group of requests. If the relative priority of the current group of requests is greater than that of at least one of the groups of requests associated with the existing decoupled writer threads, then the decoupled writer associated with the group of requests having the lowest relative priority is selected to be overtaken to serve the current group of requests. As such, the thread management function 18 switches the dependent reader threads associated with the selected decoupled writer thread to reader/writer threads and configures the reader/writer threads to operate in the reader/writer mode of operation (step 320). The thread management function 18 then switches the selected decoupled writer thread to a decoupled writer for the current group of requests (step 322) and switches the reader/writer threads for the current group of requests to dependent reader threads for the decoupled writer (step 324). The process then returns to step 300, and the loop is repeated for the next group of request.

Figure 7:
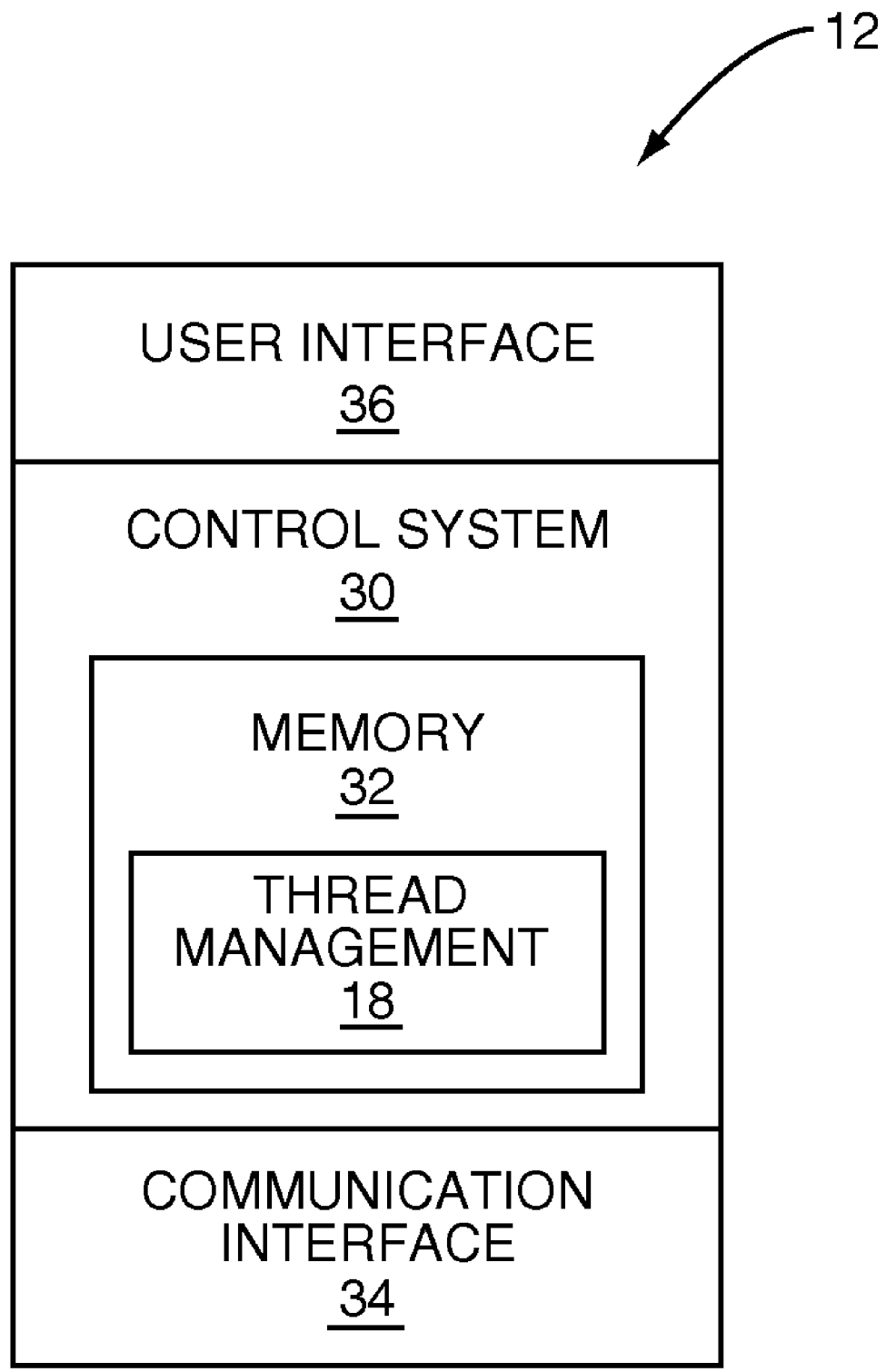
FIG. 7 is a block diagram of an exemplary embodiment of the proxy server of FIG. 1.

FIG. 7 is a block diagram of the proxy server 12 of FIG. 1 according to an exemplary embodiment of the present invention. In general, the proxy server 12 includes a control system 30 having associated memory 32. In this example, the thread management function 18 is implemented in software and is stored in the memory 32. The proxy server 12 also includes a communication interface 34 communicatively coupling the proxy server 12 to the web server 14 and the clients 16-1 through 16-N via one or more networks. The proxy server 12 may also include a user interface 36, which may include components such as, for example, a display and user input device.

The present invention provides substantial opportunity for variation without departing from the spirit or scope of the present invention. For example, while the reader/writer mode of operation has been described as including a role switching process, the present invention is not limited thereto. In an alternative embodiment, the reader/writer mode of operation may simply use the reader/writer thread associated with a first request for a digital asset 22 as the writer. In this alternative embodiment, the writer may either obtain the digital asset 22 from the web server 14 in segments, as described above, or obtain the entire digital asset 22 from the web server 14 before transferring the digital asset 22 to the associated client.

Those skilled in the art will recognize improvements and modifications to the preferred embodiments of the present invention. All such improvements and modifications are considered within the scope of the concepts disclosed herein and the claims that follow.

What is claimed is:

1. A method of operation for a proxy server comprising:
   a) receiving a plurality of concurrent requests for a digital asset;
   b) selecting a decoupled writer mode of operation for serving the plurality of current requests in response to first selection criteria, wherein if the first selection criteria is met, the method further includes:
      i) obtaining the digital asset from a web server hosting the digital asset with a decoupled writer thread;
      ii) storing the digital asset in a proxy cache of the proxy server with the decoupled writer thread;
      iii) obtaining the digital asset from the proxy cache with a dependent reader thread for each of the plurality of concurrent requests; and
      iv) transferring the digital asset to clients associated with the plurality of concurrent requests with the dependent reader threads; and
   c) selecting a reader/writer mode of operation for serving the plurality of current requests in response to second selection criteria, wherein if the second selection criteria is met, the method further includes:
      i) providing a plurality of reader/writer threads, each one of the plurality of reader/writer threads corresponding to one of the plurality of concurrent requests;
      ii) selecting one of the plurality of reader/writer threads as a writer thread operating to obtain at least a segment of the digital asset from a web server hosting the digital asset and store the at least a segment of the digital asset in the proxy cache;
      iii) configuring remaining ones of the plurality of reader/writer threads as reader threads operating to obtain a cached portion of the digital asset from the proxy cache and transfer the cached portion of the digital asset to the clients associated with the plurality of concurrent requests; and
      iv) switching roles of the writer thread and a select one of the reader threads, wherein the select one of the reader threads is identified based on a comparison of a connection speed of the writer thread and connection speeds of the reader threads.

2. The method of claim 1 wherein the decoupled writer mode of operation is selected for serving the plurality of concurrent requests, and the method further comprises switching from the decoupled writer mode of operation to the reader/writer mode of operation while serving the plurality of concurrent requests.

3. The method of claim 1 wherein the reader/writer mode of operation is selected for serving the plurality of concurrent requests, and the method further comprises switching from the reader/writer mode of operation to the decoupled writer mode of operation while serving the plurality of concurrent requests.

4. The method of claim 1 further comprising switching to the reader/writer mode of operation while serving the plurality of concurrent requests.

5. The method of claim 4 wherein switching to the reader/writer mode of operation comprises:
   switching the dependent reader threads for the plurality of concurrent requests to a plurality of reader/writer threads, each one of the plurality of reader/writer threads corresponding to one of the plurality of concurrent requests;
   selecting one of the plurality of reader/writer threads as a writer thread; and
   configuring remaining ones of the plurality of reader/writer threads as reader threads.

6. The method of claim 1 further comprising switching to the decoupled writer mode of operation while serving the plurality of concurrent requests.

7. The method of claim 6 wherein switching to the decoupled writer mode of operation comprises:
   providing the decoupled writer thread for the plurality of concurrent requests; and
   switching the plurality of reader/writer threads to the plurality of dependent reader threads that are associated with the decoupled writer thread.

8. The method of claim 6 further comprising determining whether to switch to the decoupled writer mode based on at least one criterion selected from the group consisting of: referrers of the plurality of concurrent requests, a topic to which the digital asset relates, and thread availability.

9. The method of claim 1 further comprising switching to the decoupled writer mode of operation while serving the plurality of concurrent requests.

10. The method of claim 9 wherein switching to the decoupled writer mode of operation comprises:
   switching the plurality of reader/writer threads to the plurality of dependent reader threads that are associated with the decoupled writer thread.

11. The method of claim 9 further comprising determining whether to switch to the decoupled writer mode based on at least one criterion selected from the group consisting of a churn value relating to a total number of role switches performed while serving the plurality of concurrent requests, a churn value relating to a frequency of role switches with respect to time, a churn value relating to a frequency of role switches with respect to digital bytes transferred, referrers of the plurality of concurrent requests, a topic to which the digital asset relates, and thread availability.

12. A proxy server comprising:
   a) a communication interface communicatively coupling the proxy server to a web server and a plurality of clients via a network; and
   b) a control system associated with the communication interface and adapted to:
      i) receive a plurality of concurrent requests for a digital asset from the plurality of clients;
      ii) select a decoupled writer mode of operation for serving the plurality of concurrent requests in response to first selection criteria, wherein, according to the decoupled writer mode of operation, the control system is further adapted to:
         1. provide a decoupled writer thread operating to obtain the digital asset from the web server hosting the digital asset and store the digital asset in a proxy cache of the proxy server; and
         2. provide a dependent reader thread for each of the plurality of concurrent requests, wherein the dependent reader threads operate to obtain the digital asset from the proxy cache and transfer the digital asset to the plurality of clients; and
      iii) select a reader/writer mode of operation for serving the plurality of concurrent requests in response to second selection criteria, wherein, according to the reader/writer mode of operation, the control system is further adapted to:
         1. provide a plurality of reader/writer threads, each one of the plurality of reader/writer threads corresponding to one of the plurality of concurrent requests;
         2. select one of the plurality of reader/writer threads as a writer thread operating to obtain at least a segment of the digital asset from the web server hosting the digital asset and store the at least a segment of the digital asset in the proxy cache,
         3. configure remaining ones of the plurality of reader/writer threads as reader threads operating to obtain a cached portion of the digital asset from the proxy cache and transfer the cached portion of the digital asset to the plurality of clients; and
         4. switch roles of the writer thread and a select one of the reader threads, wherein the select one of the reader threads is identified based on a comparison of a connection speed of the writer thread and connection speeds of the reader threads.

13. The proxy server of claim 12 wherein the control system selects the decoupled writer mode of operation and is further adapted to switch from the decoupled writer mode of operation to the reader/writer mode of operation while serving the plurality of concurrent requests.

14. The proxy server of claim 12 wherein the control system selects the reader/writer mode of operation and is further adapted to switch from the reader/writer mode of operation to the decoupled writer mode of operation while serving the plurality of concurrent requests.

15. The proxy server of claim 12 wherein the control system is further adapted to switch to the reader/writer mode of operation while serving the plurality of concurrent requests.

16. The proxy server of claim 15 wherein in order to switch to the reader/writer mode of operation, the control system is further adapted to:
   switch the dependent reader threads for the plurality of concurrent requests to a plurality of reader/writer threads, each one of the plurality of reader/writer threads corresponding to one of the plurality of concurrent requests;
   select one of the plurality of reader/writer threads as a writer thread; and
   configure remaining ones of the plurality of reader/writer threads as reader threads.

17. The proxy server of claim 12 wherein the control system is further adapted to switch to the decoupled writer mode of operation while serving the plurality of concurrent requests.

18. The proxy server of claim 17 wherein in order to switch to the decoupled writer mode of operation, the control system is further adapted to:
   switch the plurality of reader/writer threads to the plurality of dependent reader threads that are associated with the decoupled writer thread.

19. The proxy server of claim 12 wherein the control system is further adapted to determine whether to switch to the decoupled writer mode based on at least one criterion selected from the group consisting of: referrers of the plurality of concurrent requests, a topic to which the digital asset relates, and thread availability.

20. The proxy server of claim 12 wherein the control system is further adapted to switch to the decoupled writer mode of operation while serving the plurality of concurrent requests.

21. The proxy server of claim 20 wherein in order to switch to the decoupled writer mode of operation, the control system is further adapted to:
   provide a decoupled writer thread for the plurality of concurrent requests; and
   switch the plurality of reader/writer threads to the plurality of dependent reader threads that are associated with the decoupled writer thread.

22. The proxy server of claim 20 wherein the control system is further adapted to determine whether to switch to the decoupled writer mode based on at least one criterion selected from the group consisting of: a churn value relating to a total number of role switches performed while serving the plurality of concurrent requests, a churn value relating to a frequency of role switches with respect to time, a churn value relating to a frequency of role switches with respect to digital bytes transferred, referrers of the plurality of concurrent requests, a topic to which the digital asset relates, and thread availability.

* * * * *